INVENTORS
Hans Eberle
Gerhard Wuttke
BY
Michael J. Striker
ATTORNEY

United States Patent Office 3,538,201
Patented Nov. 3, 1970

3,538,201
METHOD OF EXTRUDING A FOAMED PLASTIC ARTICLE HAVING BREAKING LINES
Hans Eberle, Ludwigshafen (Rhine), and Gerhard Wuttke, Neuhofen, Pfalz, Germany, assignors to Gruenzweig & Hartmann A.G., Ludwigshafen (Rhine), Germany
Original application Feb. 1, 1966, Ser. No. 524,224, now Patent No. 3,489,183, dated Jan. 13, 1970. Divided and this application Aug. 26, 1968, Ser. No. 755,140
Int. Cl. B29d 27/00
U.S. Cl. 264—41      4 Claims

ABSTRACT OF THE DISCLOSURE

A tubular body of plastic material which is of substantially homogenous composition and has at least one predetermined weakened zone along which the tubular body may be fractured.

This weakened zone comprises a substantially radially extending non-scored partition line which is made by separating and merging the body along the partition line during foaming and setting wherein the molecules on one side of this line have a lesser affinity to the contacting molecules on the other side of this line than to other molecules.

---

The present application is a division of our application Ser. No. 524,224, filed Feb. 1, 1966 now Pat. No. 3,489,183.

The present invention relates to an extruded article. More specifically, the invention relates to a novel article of manufacture formed from extruded plastic material. The invention also relates to an apparatus for producing such an article and a method of producing the article with the apparatus.

It is known to insulate pipe conduits by placing about them tubes of insulating material. In the simplest form of this arrangement, the jackets of insulating material are elongated tubes whicr are simply slipped over the respective pipe conduit. However, this is practical only if the insulation of the conduit is accomplished before installation of the conduit itself; once the conduit has been installed in place, it is necessary to supply the insulating jackets in two or more sections which are obtained by longitudinally slitting the jackets. These sections can then be placed about the conduit and suitably secured thereto, for example by means of adhesives, by clamping or by other well known expedients.

Materials known for manufacturing the insulating jackets include cork, foamed glass, foamed plastic materials such as polyurethane foam, foamed polystyrene or other plastic materials well known to those skilled in the art, and also glass or mineral fibers which are suitably joined by means of any of the many available binders. Selection of the material for the insulating jackets depends on various factors, including the continuous temperature which is to be maintained in the conduit-to-be-insulated.

Of course, supplying the insulating jackets in two or more segments is inconvenient and requires added installation time since the segments must be properly placed onto the pipe, butted to minimize radiation losses at the joints, and then secured. To eliminate some of these problems the suggestion has been made to provide insulating jackets of this type in two segments which are hinged together so that they can be opened up, placed about the conduit-to-be-insulated simultaneously, and thereupon closed and secured. In fact, to provide better insulation at the points at which the two segments abut, it has also been proposed to provide these points, which of course are longitudinally extending abutment faces, with stepped profiles which are complementary and interlock when the two segments are placed together.

A further development of this proposal was to make the hinge integral with the rest of the material in that the segments during their manufacture are not completely separated along one of the two separating lines, so that the unsevered portion of the material will serve as a hinge which is capable of withstanding an adequate number of opening and closing movements.

Lately, the use of plastic materials, and in particular of foamed plastic materials for such insulating jackets has grown very significantly. Concomitantly with this development, the use of extruding processes for producing the jackets has become more common. In such arrangements, if a foam-type material is used, a powder or a granulate is mixed with a blowing agent and the mixture is passed under high pressure through an extruder. Upon leaving the nozzle of the extruder the mixture, which is in flowable state, will foam and then set into the desired form which is determined by the shape of the nozzle and the shape of a mandrel disposed within the nozzle. The resulting tube is then simply cut into sections of the desired length and these sections are longitudinally slit to obtain two segments. Finally, the abutment faces of these segments can be stepped, for example by means of a milling process, so that upon their abutting these profiles will interlock and assure a better seal.

However, all of this is not entirely satisfactory since the production is relatively complicated, requiring, as it does, longitudinal slitting of the tube sections and subsequent milling of their abutment faces. Furthermore, the inner cross sectional area is frequently out-of-round because of the various manufacturing steps the sections undergo after foaming of the material.

It is therefore a general object of the present invention to overcome the above-mentioned drawbacks of the prior art.

A more specific object of the present invention is to provide insulating jackets of the type described above which can be readily and inexpensively manufactured, which need undergo no subsequent treatment to be ready for use in the field, and which remain integral until such time as they are used in the field for installation onto a pipe conduit.

A further object of the invention is to provide a method of producing such insulating jackets.

A concomitant object of the invention is to provide an apparatus for carrying out the above-mentioned method.

In accordance with one feature of our invention we therefore provide, as a novel article of manufacture, a body of extruded plastic material having at least one zone in which resistance of such material to mechanical separating forces acting on the body is less than in the remainder of the body. The zone in question is located between and integrally joins two immediately adjacent portions of the body.

The method of producing the above-identified article comprises the steps of conveying a liquefied or plasticized mass of material in a predetermined path, temporarily separating this liquefied mass into two adjacent portions during the conveying thereof in this path and merging the thus separated portions prior to setting of the liquefied material, whereby the strength of the bond between the merged portions in the finished body is lower than the strength of the remainder of the material in the body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
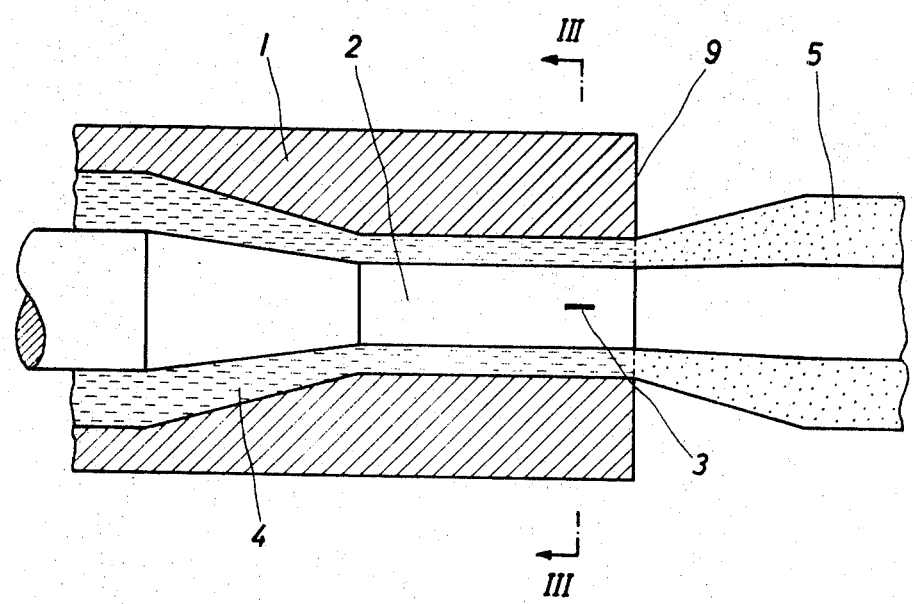
FIG. 2 is a longitudinal section through the nozzle of an extruder for producing the jackets shown in FIGS. 1a–1e.
Figure 3:
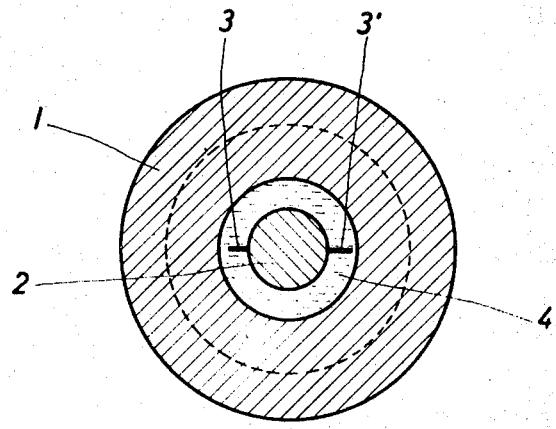
FIG. 3 is a somewhat diagrammatic cross section taken on the line III—III of FIG. 2.

Discussing firstly the extruder nozzle shown in FIG. 2, it will be seen that there is shown a mandrel 2 which is so arranged within the nozzle 1 as to define between its outer surface and the inner surface of the nozzle 1 a passage through which a flowable plastic mass 4 passes. The mandrel 2 carries on its exterior surface adjacent the outlet of the extruder nozzle one or more projections, such as knife-like elements 3 (only one shown) which extend into the path of the flowable plastic mass 4.

It will be understood that the knife-like elements 3 could equally be provided on the interior surface of the extruder nozzle, and that, wherever they may be provided, they can be made to be radially movable, simultaneously or individually. Furthermore, it is not necessary that the knife-like elements 3 be arranged precisely at the point at which they are shown in the drawing; it is also possible to provide suitable means for securing them on the front face 9 of the extruder nozzle so as to have them extend into the path of the flowable plastic mass outside of the nozzle 1. With certain plastics it may even be desirable to arrange the elements 3 just downstream of the front face 9.

To understand the operation of this arrangement it must be kept in mind that, as the flowable plastic mass 4 passes by the knife-like elements 3, it is separated by them, and that it again merges into an integral mass downstream of the elements 3. Now, it has been found that in a flowable plastic mass which is so treated and is subsequently allowed to set, the strength of the material along the line or lines along which it was separated by the knife-like elements 3 prior to its setting has been weakened so that a slight mechanical force, such as pressure exerted by an operator prior to installation, will serve to sever the material along the respective lines, although the material appears to be wholly integral along these lines.

It is possible to establish various theories for this phenomenon, which probably depends to a large extent on the particular material used. The most likely theory is that the material, particularly foam-type plastic material which at the point at which it comes in contact with the knife-like elements 3 is already going through a prefoaming stage, experiences in the zone in which it is first slit and subsequently remerged a kind of molecular reorientation. This may be compared to a slurry of fibers which passes a similar knife-like projection. In that case the fibers, which originally are interwoven and felted, are reoriented by engagement with the projection so as to extend parallel to the surface of the projection. A similar process probably takes place with respect to the molecules of the plastic material, particularly the foam-type. In other words, the originally interwoven and curled-up molecules, which in the materials in question are relatively long, are probably disentangled and straightened and extend parallel to the surfaces of the projection 3. Upon remerging the material reunites, but the bond of the molecules along the severing lines is and remains weakened.

Figure 1A:
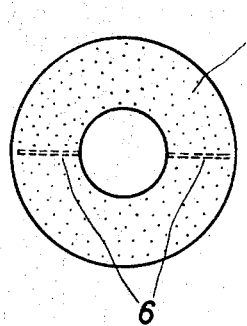
FIG. 1a is a somewhat diagrammatic end view of a jacket produced in accordance with the present invention.

It is one of the surprising factors in this invention that the weakened zones, which might also be called preset breaking lines, are not visible without considerable magnification. In other words, the weakened zones are by no means slots or slits in the material of the extruded jackets; rather, the material retains its structural integrity and is merely weakened in its mechanical strength. This, of course, would seem to be in keeping with the above-mentioned theory, Turning now to FIGS. 1a–1e, it will be seen that there are shown various different embodiments of the invention. In FIG. 1a the tubular jacket of insulating material is designated with reference numeral 5 and it will be seen that this jacket is provided with two diametrically opposite weakened zones 6. A relatively slight mechanical force exerted on the jacket 5 will cause separation of the two sections thereof along the respective zones 6.

Figure 1B:
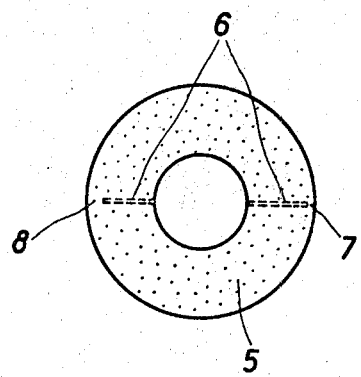
FIGS. 1b–1e are views similar to that of FIG. 1a, but representing various different embodiments of the jacket.

In FIG. 1b there is shown a slight modification, in that in this embodiment one of the weakened zones 6 extends from the inner surface to the outer surface of the jacket 5, as indicated with reference numeral 7, whereas the other of the weakened zones 6 terminates some distance inwardly of the outer surface of the jacket 5, this distance being indicated with reference numeral 8. That portion 8 through which the weakened zone does not extend, thus can serve as a type of integral hinge; in other words, a separation of the two sections of the jacket 5 will not be complete since there will be no separation of the material in the zone 8, so that the two sections can be opened and closed about this zone 8 as if the latter were a hinge.

Figure 1C:
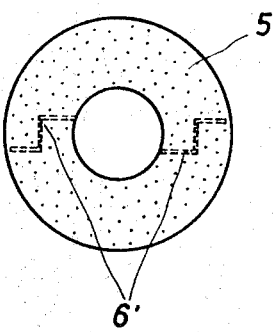

In FIG. 1c there is shown a further embodiment and it will be evident that the weakened zone 6' shown in FIG. 1c is stepped, from which it follows that the projections 3 (not shown) used to produce this embodiment are similarly configurated. Accordingly, when the two sections of the jacket 5 are separated and are joined again after being placed about a pipe conduit, the stepped profiles of the respective sections will interengage with one another and produce a tightly sealed joint.

Figure 1D:
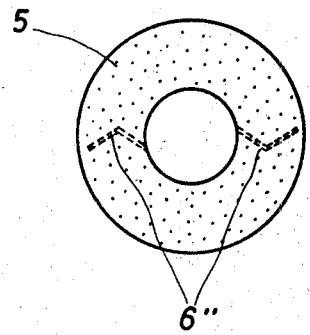
Figure 1E:
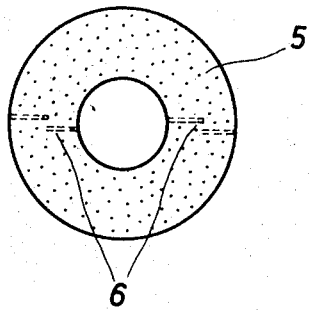

FIG. 1d is a slight modification of the embodiment shown in FIG. 1c, the particular profiling of the weakened zones being indicated with reference to numeral 6''.

FIG. 1e, finally, again is somewhat different, the arrangement of the weakened zones 6 however being provided for the same purpose as in FIGS. 1c and 1d, namely to achieve a stepped profiling of the abutment faces of the two sections of jacket 5, so as to provide a better fit when two sections are reunited after having been placed about a pipe conduit.

It has been found that jackets provided with such preset breaking lines or weakened zones can be bent and even given an annular shape, without any damage to the weakened zones, and without premature and undesired separation of the sections of the jacket along such weakened zones during bending of the jackets. Of course, the bending per se is well known and need not be further described here.

Also, a slightly off-center arrangement of the mandrel 2 shown in FIG. 2 will cause the jacket to be already extruded in arcuate form with the weakened zones provided therein. This is of particular advantage if the jacket is to be used for covering an arcuately curved section of a pipe conduit.

Various modifications are of course possible. For example, the interior surface of each jacket may be coated with a pressure-sensitive adhesive so that, after separation of the sections, the jacket can be installed on a pipe conduit simply by pressing the sections against the pipe conduit and having the abutment faces of the sections abut each other. This results in a very fast and very clean installation.

The exact positioning of the knife-like elements 3 is, as has previously been pointed out, subject to some variation. Tests have shown that a positioning approximately 5 millimeters upstream of the front face 9 of the extruder nozzle 1 is highly satisfactory. Various plastic materials have been found satisfactory, among these being polystyrene, polyvinyl chloride, polyethylene, polypropylene, and various graft polymers, for example such as the one available commercially under the trade name "Tyrilfoam."

It will be understood that each of the elements described above, or two or more together, may also find a useful application in other types of extruded bodies and in extrusion processes differing from the types described above.

While the invention has been illustrated and described as embodied in an extruded body and in an extruding process, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A method of manufacturing a body from foam plastic material and of providing said body with at least one zone in which the resistance of said material to mechanical separating forces acting upon said body is less than in the remainder of said body, said method comprising the steps of conveying in a predetermined path a flowable mass of foamable plastic material in which foaming has begun; temporarily separating said material into two adjacent portions during conveying in said path; and merging the thus separated portions without pressure and prior to complete foaming and setting of said material, whereby the strength of the bond between the merged portions in the finished body is lower than the strength of the remainder of the material in said finished body.

2. A method as defined in claim 1, wherein the step of conveying said material comprises passing the same through an orifice of an extruder; and wherein the step of temporarily separating said material is effected upstream of and adjacent to the outlet of said orifice.

3. A method as defined in claim 1, wherein the step of conveying said material comprises passing the same through an orifice of an extruder; and wherein the step of temporarily separating said material is effected immediately downstream of the outlet of said orifice.

4. A method as defined in claim 1, wherein said foam plastic material is selected from the group comprising polystyrene, polyvinyl chloride, polyethylene, polypropylene and graft polymers.

References Cited

UNITED STATES PATENTS

| | | | |
|---|---|---|---|
| 287,699 | 10/1883 | Meeker | 25—17 |
| 726,144 | 4/1903 | Daniel | 25—17 |
| 1,677,808 | 7/1928 | Alassio et al. | 25—17 XR |
| 1,906,744 | 5/1933 | Frandsen | 25—17 |
| 1,943,506 | 1/1934 | Baer. | |
| 2,011,160 | 8/1935 | Plepp. | |
| 2,363,261 | 11/1944 | Ritter | 25—17 |
| 2,817,113 | 12/1957 | Fields | 18—14 |
| 3,403,203 | 9/1968 | Schirmer. | |

J. SPENCER OVERHOLSER, Primary Examiner

R. S. ANNEAR, Assistant Examiner

U.S. Cl. X.R.

264—46, 47, 51